No. 708,197. Patented Sept. 2, 1902.
W. BRANKOWITCH.
BRAKE FOR CYCLES.
(Application filed Nov. 15, 1901.)
(No Model.)
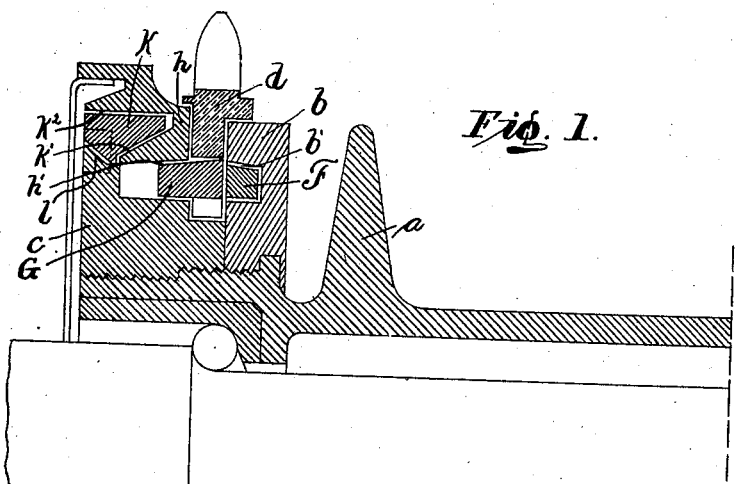
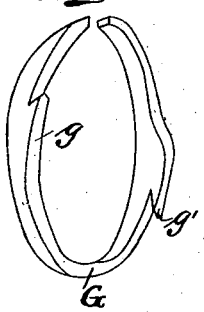
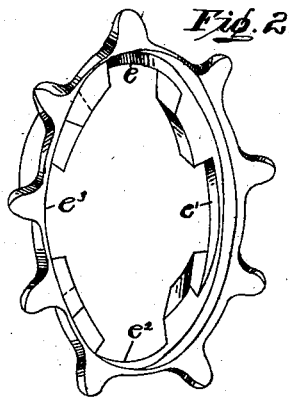
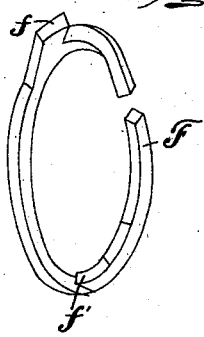
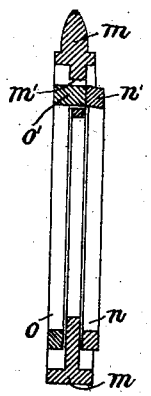
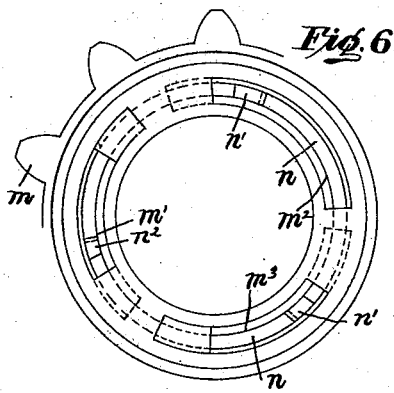
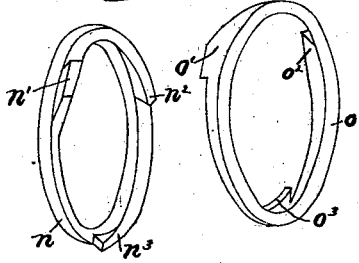
WITNESSES:
INVENTOR
W. Brankowitch
BY
ATTORNEY

UNITED STATES PATENT OFFICE.

WLADIMIR BRANKOWITCH, OF PARIS, FRANCE, ASSIGNOR TO ALBERT MATIFAT AND CO., OF PARIS, FRANCE.

BRAKE FOR CYCLES.

SPECIFICATION forming part of Letters Patent No. 708,197, dated September 2, 1902.

Application filed November 15, 1901. Serial No. 82,488. (No model.)

*To all whom it may concern:*

Be it known that I, WLADIMIR BRANKOWITCH, a subject of the King of Servia, residing at Paris, France, have invented certain new and useful Improvements in Brakes for Cycles; and I do hereby declare the following to be a full, clear, and exact description of the invention, such as will enable others skilled in in the art to which it appertains to make and use the same.

This invention relates to brakes for cycles, and has for its object to provide an improved device of this class to be applied to the rear wheel, in which are improved independent driving and braking means whereby driving and stopping are facilitated and slipping or failure of action of the parts are avoided.

With this object in view the invention consists in the improved construction, arrangement, and combination of parts hereinafter described and afterward specifically claimed.

In the accompanying drawings, Figure 1 is a partial sectional view of a driving-wheel hub constructed in accordance with my invention. Fig. 2 is a detail perspective view of the split braking-ring detached. Fig. 3 is a similar view of the sprocket driving-wheel. Fig. 4 is a similar view of the split driving-ring. Fig. 5 is a tranverse sectional view of the sprocket-wheel engaged with driving and brake rings of a modified construction. Fig. 6 is a view in elevation of the pinion and back ring shown in Fig. 5. Fig. 7 is a detail perspective view of the modified form of brake-ring, and Fig. 8 a similar view of the modified form of driving-ring.

Referring to the drawings, Figs. 1 to 4, $a$ indicates the hub of the driving-wheel, upon which are threaded two rings $b$ and $c$, the former of which is used in driving and the latter in braking the cycle. The sprocket-wheel is indicated at $d$ and is provided on one side with four inclined cam-surfaces $e$, $e'$, $e^2$, and $e^3$. F indicates a split driving-ring provided with cam-surfaces $f f'$ to engage the cam-surfaces $e$ $e^2$ of the sprocket-wheel $d$. G indicates a split braking-ring provided with cam-surfaces $g g'$ to engage the cam-surfaces $e' e^3$ of the sprocket-wheel $d$. When pedaling forward, the sprocket $d$, which is held laterally between the ring $b$ and a part $h$ fixed to the frame of the machine, gives, by the engagement of its inclines $f f'$ with the cam-surfaces $e e^2$, a rotation to the ring F, which is then brought close against an incline $b'$ of the ring $b$, and thus produces the rotation of the hub and wheel. At that time the ring G revolves freely with the pinion without any effect. Upon ceasing action upon the pedals the ring F has a tendency to disengage the ring $b$ and is moved laterally to its first position, and the cycle may run under the influence of the acquired speed without any motion of the pedals; but should the pedals be actuated backward the ring G will come into action through the contact of $e' e^3$ with the inclines $g g'$, the ring G pressing against the conical part $h'$ of the piece $h$ and causing the braking of the latter at the points $k' k^2$ against the walls of the extension-ring $k$, connected to the piece $c$ by means of a pin $l$. A forward motion of the cycle may then be obtained again by pedaling normally, as explained above. The pinion illustrated in the annexed drawings has four cam-surfaces to correspond in pairs with the two lateral inclines of each of the two conical rings.

Referring now to Figs. 5, 6, 7, and 8, which represent a modified form of construction, with rings rigid instead of split, Fig. 5 shows the two inclines of the rings in engagement, and Fig. 6 is the pinion with the back ring in place, the front ring being removed and the two rings being shown, respectively, in perspective in Figs. 7 and 8. The pinion $m$ is provided, for example, with three inclined closed notches $m'$ $m^2$ $m^3$, and the rings $n$ and $o$ are each provided with three inclines, as $n' n^2 n^3$ and $o' o^2 o^3$ in such relation that pairs $n'$ and $o' n^3$ and $c^2$ are adapted to engage each other through the respective notches by passing in pairs into the same notches, as $m' m^2$, &c., of the pinion. The operation is the same as in the before-described device, (construction of Figs. 1 to 4,) and the solidity of rings $n$ and $o$ secures absolutely their approach to each other and assures the perfect operation of the parts without sliding or failure to engage.

Having thus fully described my invention, what I claim as new, and desire to secure by Letters Patent of the United States, is—

In brakes for cycles, the combination with the driving-wheel hub and two rings, as b and c, threaded thereon, of the sprocket-wheel having diametrically opposite cam-surfaces, and a loose ring provided with correspondingly-located inclines adapted to engage said cam-surfaces when the sprocket-wheel is rotated forward, and a second loose ring having inclined surfaces located relatively to those of the first ring in such position as to engage, when the sprocket is rotated backward, cam-surfaces of the sprocket-wheel alternating with those engaged by the inclines of the first-mentioned wheel, substantially as described.

In testimony whereof I affix my signature in presence of two witnesses.

WLADIMIR BRANKOWITCH.

Witnesses:
EMILE GRIMONT,
VICTOR PRÉVOST.